(12) United States Patent
Gruber et al.

(10) Patent No.: US 7,490,790 B1
(45) Date of Patent: Feb. 17, 2009

(54) SPOOL FOR FISHING REEL

(75) Inventors: Gerhard Gruber, Meinheim (DE);
Walter Baumgartner, Theilenhofen (DE)

(73) Assignee: Okuma Fishing Tackle Co., Ltd., Taichung (TW)

( * ) Notice: Subject to any disclaimer, the term of this patent is extended or adjusted under 35 U.S.C. 154(b) by 0 days.

(21) Appl. No.: 11/865,350

(22) Filed: Oct. 1, 2007

(51) Int. Cl.
*A01K 89/00* (2006.01)

(52) U.S. Cl. .............. 242/322; 242/125.1; 242/584.1; 242/587.2

(58) Field of Classification Search ............ 242/322, 242/125.1, 579, 584.1, 587.2; 254/DIG. 14, 254/371, 372, 373
See application file for complete search history.

(56) References Cited

U.S. PATENT DOCUMENTS

| | | | | |
|---|---|---|---|---|
| 2,329,943 | A * | 9/1943 | Robins | 242/587.1 |
| 4,398,679 | A * | 8/1983 | Kluczynski et al. | 242/584.1 |
| 5,507,443 | A * | 4/1996 | Miyazaki | 242/322 |
| 6,286,773 | B1 * | 9/2001 | Ikuta | 242/260 |
| 6,467,712 | B1 * | 10/2002 | Cribb | 242/322 |
| 6,609,671 | B2 * | 8/2003 | Heesch | 242/322 |
| 6,857,590 | B2 * | 2/2005 | Heesch | 242/322 |
| 7,108,248 | B2 * | 9/2006 | Winter et al. | 254/371 |

* cited by examiner

*Primary Examiner*—Emmanuel M Marcelo
(74) *Attorney, Agent, or Firm*—Browdy and Neimark, P.L.L.C.

(57) ABSTRACT

A spool for a fishing reel is disclosed to include an axle, which has a surface and a recess curved inwards from the surface, two sidewalls radially extending from the two distal ends of the axle, and a pin, which is disposed in the recess with the topmost edge thereof kept in flush with the surface of the axle for the fastening of a fishing line for allowing the spool to take up or let off the fishing line smoothly.

14 Claims, 2 Drawing Sheets

SPOOL FOR FISHING REEL

BACKGROUND OF THE INVENTION

1. Field of the Invention

The present invention relates to a fishing reel and more specifically, to a spool for fishing reel that allows the user to take up or let off the fishing line smoothly.

2. Description of the Related Art

FIG. 1 illustrates a conventional spool for fishing reel. According to this design, the spool 1 comprises an axle 2, two sidewalls 3 radially extending from the two distal ends of the axle 2, and a pin 4 protruded from a middle part of the axle 2 for the fastening of one end of the fishing line. After one end of the fishing line has been fastened to the pin 4, the spool 1 can be rotated to wind the fishing line on the axle 2.

However, the pin 4 has a height (h) about 3.0~3.5 mm. When rotating the spool 1 to let off the fishing line, the pin 4 may hinder the movement of the fishing line, causing the finishing line to be tangled. Lowering the height of the pin 4 may eliminate this problem. However, it is difficult to tie a fishing line to a short peg.

FIG. 2 shows another conventional spool 5 for fishing reel. The spool 5 is provided with an axle 6 and two sidewalls (not shown). The axle 6 has two recesses 7 and a middle wall 8 defined between the two recesses 7. The middle wall 8 is provided with a hole 9 through which the fishing line passes such that the fishing line can be fastened to the spool 5. The structure is formed after a lot of manufacturing processes, thus the cost is high.

Therefore, it is desirable to provide a spool for fishing reel that eliminates the aforesaid problem.

SUMMARY OF THE INVENTION

The present invention has been accomplished under the circumstances in view. It is therefore one object of the present invention to provide a spool for fishing reel, which allows positive fixation of the end of the fishing line and prevents unsmooth operation of the fishing reel.

To achieve this and other objects of the present invention, the spool for fishing reel comprises an axle, two sidewalls, and a pin. The axle has a surface, and a recess curved inwards from the surface. The two sidewalls extend radially from the two distal ends of the axle. The pin is disposed in the recess for the fastening of a fishing line. This arrangement effectively lowers the elevation of the pin relative to the surface of the axle, preventing unsmooth operation of the fishing reel.

DETAILED DESCRIPTION OF THE INVENTION

Figure 1:
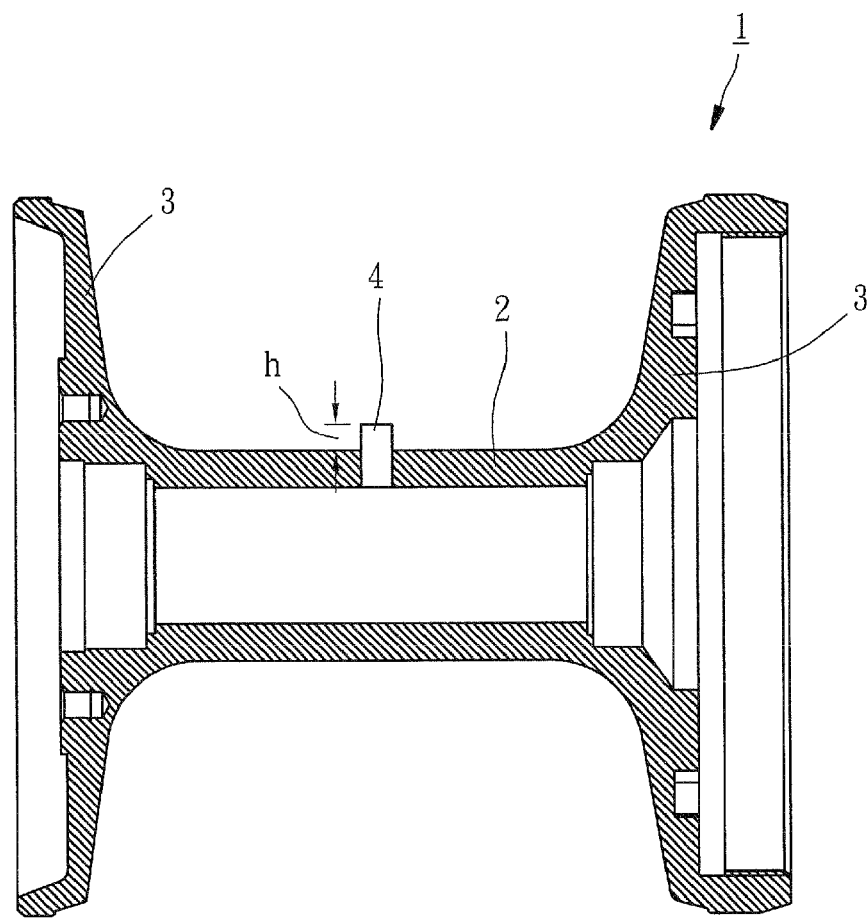
FIG. 1 is a front view of a spool for fishing reel according to the prior art.
Figure 2:
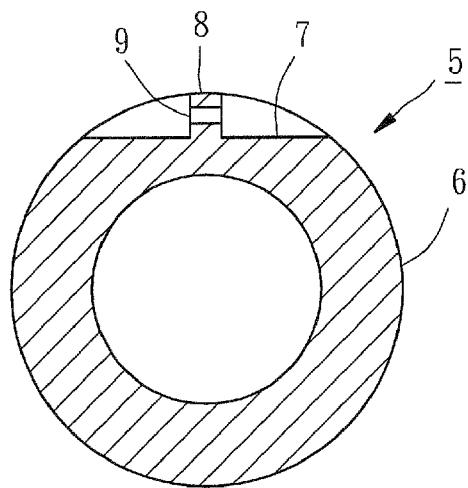
FIG. 2 is a sectional view of a spool for fishing reel according to another prior art.
Figure 3:
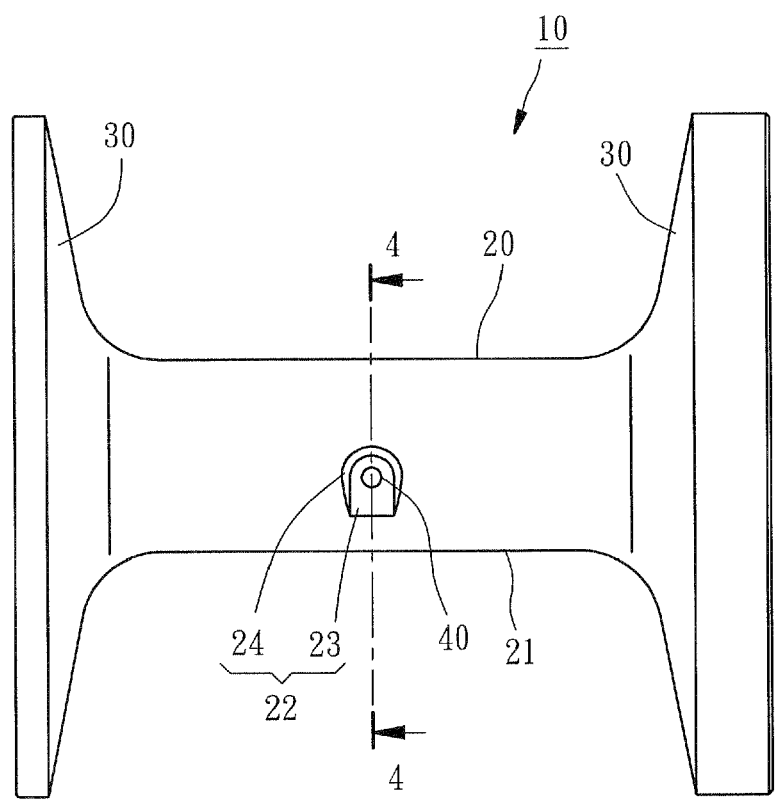
FIG. 3 is a front view of a spool for fishing reel according to the present invention.
Figure 4:
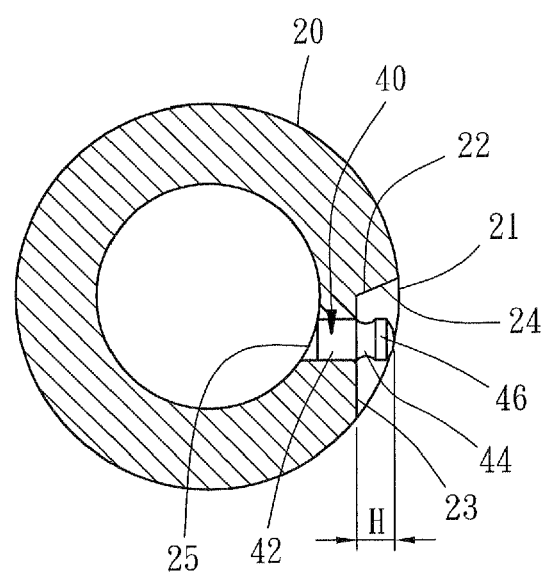
FIG. 4 is a sectional view taken along line 4-4 of FIG. 3.

Referring to FIGS. 3 and 4, a spool 10 in accordance with the present invention is shown for use in a fishing reel. The spool 10 comprises an axle 20, two sidewalls 30, and a pin 40. The spool 10 can be adopted by spinning reel, trolling reel, fly reel or other type of fishing reel.

The axle 20 has a surface 21, a recess 22 curved inwards from the surface 21, and an insertion hole 25 formed in the recess 22. The recess 22 has a bottom wall 23 and a sloping peripheral wall 24 outside the bottom wall 23. The bottom wall 23 is a plane. The sloping peripheral wall 24 is a substantially C-shaped sloping wall extending around the border of the bottom wall 23. The insertion hole 25 is formed in the bottom wall 23 of the recess 22.

The two sidewalls 30 extend radially extending from the two distal ends of the axle 20.

The pin 40 is disposed in the recess 22 of the axle 20. Actually, the pin 40 has a shank 42 fitted into the insertion hole 25 and a head 46 at the top side of the shank 42, and a neck 44 connected between the shank 42 and the head 46. The neck 44 has a smaller diameter relative to the head 46 so that the user can conveniently tie a fishing line to the neck 44. The topmost edge of the pin 40, i.e., the top side of the head 46 is kept in flush with the surface 21 of the axle 20.

Similar to the conventional design, the pin 40 has a height (H) about 3.0 mm. Further, because the topmost edge of the pin 40 is kept in flush with the surface 21 of the axle 20. Even if the line capacity of the spool 10 is low, the pin 40 does not interfere with the fishing line, and the finishing line can be smoothly extended out when the user rotates the spool 10 to let off the fishing line.

The key point of the scope of the present invention is the provision of the recess 22 in the axle 20 to lower the elevation of the topmost edge of the pin 40 relative to the surface 21 of the axle 20. Even the pin 40 is so arranged that the topmost edge of the pin 40 slightly protrudes over the surface 21 of the axle 20, the interference problem of the pin 40 with the finishing line can be reduced. If the pin 40 is so arranged that the topmost edge of the pin 40 is kept below or in flush with the elevation of the surface 21 of the axle 20, the interference problem of the pin 40 with the finishing line is completely eliminated.

According to the present invention, the location and shape of the recess 22 may be changed without departing from the spirit and scope of the invention.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A spool for a fishing reel, said spool being used for winding a fishing line thereon and comprising:
   an axle having a surface and a recess curved inwards from said surface;
   two sidewalls radially extending from two distal ends of said axle; and
   a pin disposed in and projecting out from said recess so that an end of said fishing line can be fastened to said pin.

2. The spool as claimed in claim 1, wherein said pin has a free end disposed flush with the surface of said axle.

3. The spool as claimed in claim 1, wherein said pin has a free end disposed at an elevation lower than the surface of said axle.

4. The spool as claimed in claim 1, wherein said recess of said axle has a bottom surface and a slope surface partially surrounding said bottom surface.

5. The spool as claimed in claim 1, wherein said axle has an insertion hole formed in said recess for receiving said pin.

6. The spool as claimed in claim 1, wherein said pin has a head at a free end thereof.

7. The spool as claimed in claim 1, wherein said pin has a neck on a middle part thereof.

8. The spool as claimed in claim 1, wherein a free end of said pin is spaced away from said recess.

9. A spool for a fishing reel, comprising:
- an axle having a surface and a recess curved inwards from said surface;
- two sidewalls radially extending from two distal ends of said axle;
- a pin disposed in said recess, and
- wherein said recess of said axle has a bottom surface and a slope surface partially surrounding said bottom surface.

10. The spool as claimed in claim 9, wherein said pin has a free end disposed flush with the surface of said axle.

11. The spool as claimed in claim 9, wherein said pin has a free end disposed at an elevation lower than the surface of said axle.

12. The spool as claimed in claim 9, wherein said axle has an insertion hole formed in said recess for receiving said pin.

13. The spool as claimed in claim 9, wherein said pin has a head at a free end thereof.

14. The spool as claimed in claim 9, wherein said pin has a neck on a middle part thereof.

\* \* \* \* \*